Feb. 28, 1950     B. S. OLSSON     2,498,821
GEAR CHANGING SYSTEM
Filed Sept. 19, 1946
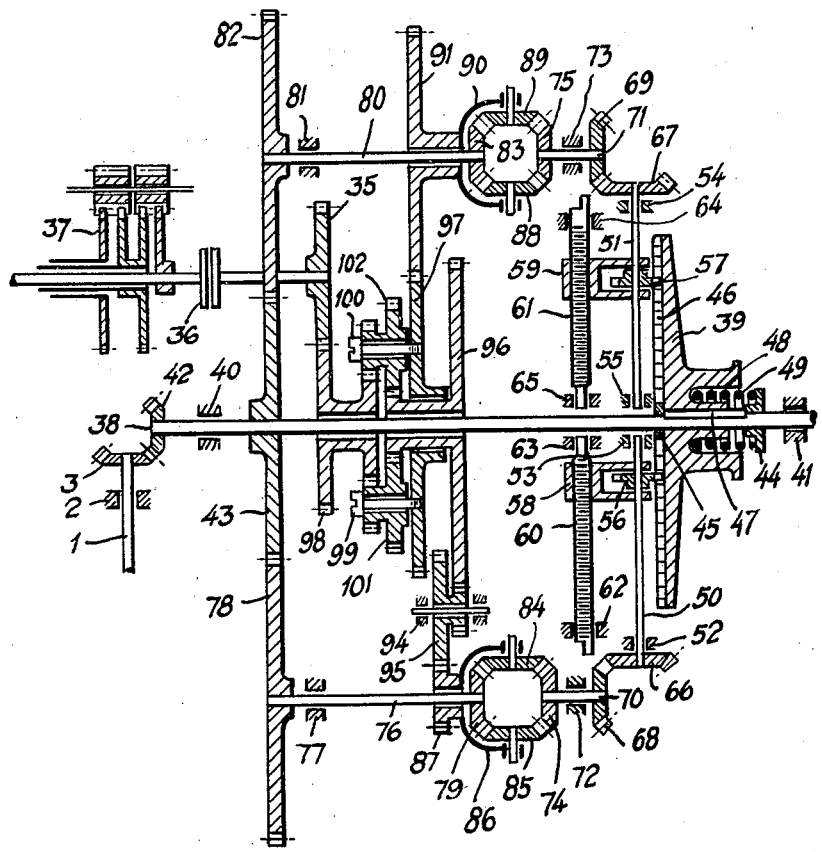
Inventor:
Birger Sten Olsson
By: Pierce, Scheffler & Parker,
Attorneys.

Patented Feb. 28, 1950

2,498,821

UNITED STATES PATENT OFFICE 2,498,821

GEAR CHANGING SYSTEM

Birger Sten Olsson, Linhamn, Sweden, assignor to Aktiebolaget Ljungmans Verkstader, Malmo, Sweden, a corporation of Sweden Application September 19, 1946, Serial No. 697,896
In Sweden February 15, 1945

Section 1, Public Law 690, August 8, 1946
Patent expires February 15, 1965

3 Claims. (Cl. 74—681)

The present invention relates to a gear changing system comprising a gear wheel having a number of gear rims of different diameters, a so-called step gear or crown wheel, which is so arranged that any one of the gear rims can be placed in driving engagement with another gear wheel to permit different speeds to be obtained at the latter, and transmitted to a differential gear, to one wheel of which a movement is also imparted which has a definite relation to the movement of the gear wheel with the gear rims, this movement being combined with the movement derived from one of the gear rims for the purpose of driving a counting mechanism for example.

In known gear changing systems of this kind it is certainly possible to select the diameter and number of teeth on the smallest step wheel as desired, but where this number of teeth corresponds to a price transmitted to a price-calculating machine, of 1 cent per litre for a fluid the retailing system for which drives the gear wheel with gear rims in such a way that each revolution of the retailing system's spindle corresponds to a definite retailed quantity of fluid, the next gear rim which must record a price corresponding to 2 cents per litre must have double the number of teeth, and the next one three times as many teeth as the first one, etc. The number of teeth will thus increase with extreme rapidity and with a figure which is a multiple of the number of teeth in the smallest wheel. This has the disadvantage of a rapidly increasing diameter in the step gear. Alternatively it might be possible to arrange matters by employing a step gear or crown wheel which is interchangeable, and possibly making the gear wheel cooperating with the former interchangeable. This alternative is inconvenient from many points of view however, partly since the exchange wastes time, partly because the apparatus is expensive and in part on account of the fact that special bearings would be required for each size in the case of the step gears at least.

An object of the present invention is to overcome these difficulties and provide a gear changing system which is independent of the diameter and number of teeth in the gear rim having the smallest diameter and allows the selection of any desired wheel combinations in the step gear or crown wheel, for example 20, 21, 22, 23, etc., teeth and produces a movement corresponding to 0, 1, 2, 3, etc., revolutions at the outgoing spindle. In the ordinary form of construction a step gear requires 10, 20, 30, 40, etc., teeth to produce 1, 2, 3, 4, etc., revolutions at the outgoing spindle. It is also the object of the invention to provide a gearing in which for certain purposes a given additional movement can be imparted to the movement produced by the crown wheel or step gear. Finally, the invention seeks to provide a gearing in which it is possible with a single crown wheel or a single step gear and two or more gear wheels cooperating with the former, to effect the addition of the said gear wheels' movements so that when one of the gear wheels is adjusted to the crown wheel to record hundreds, another to record tens and a third to record single cents per litre of the fluid retailed for example, the movements of all the gear wheels can be transmitted independently of each other to a common price calculating mechanism and record the total sum on the latter for the quantity of fluid retailed in accordance with the set price per litre.

The invention is illustrated in one form of construction in the accompanying drawing in which the single figure diagrammatically and in section shows a crown wheel cooperating with two gear wheels which can be adjusted to any one of the gear rims on the said crown wheel and provided with two differential gears, one for each gear wheel, and arranged in accordance with the invention.

The arrangement shown in the figure comprises a crown wheel, that is to say, a wheel having the gear rims lying in the same radial plane, and the crown wheel cooperates with two gear wheels, one of which is adjustable for recording units, and the other tens of cents per litre of fluid retailed, the gear wheels adding their movements before the combined movement is transmitted to a price calculating mechanism.

In the figure, 1 is the shaft of the retailing device, this shaft being supported in a bearing 2 and provided with the bevelled gear wheel 3. The driving shaft 38 for the crown wheel 39 is rotatably mounted in bearings 40 and 41 and carries the gear wheel 42 which is in engagement with the gear wheel 3 and a rigidly mounted disc 44 and a fixed stop 45. The crown wheel 39 is provided with a number of gear rims 46 arranged outside one another and in the same plane, and is axially displaceable on the shaft 38 between the stop 45 and the disc 44. A longitudinal key 47 maintains the crown wheel 39 in constant driving connection with the shaft 38. Between the disc 44 and a notch 48 in the hub of the crown wheel a spiral spring 49 is mounted which presses the crown wheel in the direction of the stop 45.

The two shafts 50 and 51 are mounted one on each side of the shaft 38 in line with one another and at right-angles to the shaft 38. These shafts are supported in bearings 52, 53 and 54, 55 and each carry a gear wheel 56 and 57 arranged to be displaced axially on its respective shaft, and each gear wheel is provided with a yoke 58 and 59, a screw-threaded spindle 60 and 61, bearings 62, 63 and 64, 65 for the respective spindles etc. Each of the shafts 50, 51 also carries a gear wheel 66 and 67. The gear wheels 66 and 67 are each in engagement with their gear wheel 68 and 69, mounted on their respective shafts 70 and 71, each of which is supported in a bearing 72 and 73 and carries a further gear wheel 74 and 75 each associated with its differential gear.

In line with the shaft 70 the shaft 76 is supported in the bearing 77 and carries the gear wheel 78 which is in engagement with the gear wheel 43 and a gear wheel 79 associated with one of the differential gears. In the same manner, and in line with the shaft 71, the shaft 80 is supported in the bearing 81 and carries the gear wheel 82 which is in engagement with the gear wheel 43 and a gear wheel 83 associated with the other differential gear. The lower differential gear has planet wheels 84, 85 rotatably supported in the fork 86 rigidly mounted on the gear wheel 87 which is supported so that it can turn freely around the shaft 76. The upper differential gear has planet wheels 88, 89 rotatably mounted in the fork 90 rigidly mounted on the gear wheel 91 which is supported so that it can turn freely around the shaft 80. The shaft 92 which is supported in bearings 93 and 94 carries the rotatable gear wheel 95 which, through a gear rim, is in engagement with the gear wheel 87 and with another gear rim in engagement with the gear wheel 96 which also has two gear rims, a support being formed between the latter for a gear wheel 97 supported to rotate freely around the hub of the gear wheel 96, and in engagement with the gear wheel 91. The gear wheel 96 and another gear wheel 98, also provided with two gear rims, are supported to rotate freely beside one another on the shaft 38. The gear wheel 97 carries two fixed pin shafts 99 and 100 which form bearings for the gear wheels 101 and 102 rotating around them freely and each have two gear rims, one of which is in engagement with one of the gear rims on the gear wheel 96, the other being in engagement with one of the gear rims on the gear wheel 98. The other gear rim on the gear wheel 98 is in engagement with the gear wheel 35 which through a friction coupling 36 drives the price calculating mechanism 37, which is of a kind known per se and thus does not constitute part of the present invention and, therefore, is not shown in detail in the drawing or described. The spindle 60 and 61 can each be turned separately by means of keys for setting the gear wheels 56 and 57 in engagement with any one of the gear rims on the crown wheel 39. On making this adjustment the crown wheel is first disengaged from the gear wheels 56, 57 by being displaced towards the disc 44 against the action of the spring 49. This may be effected by a suitable shifting fork (not shown) operating on the neck of the crown wheel in the manner illustrated in my Patent No. 2,464,678. On completion of the adjustment the spring 49 brings back the crown wheel into engagement with the gear wheels 56, 57.

The shafts 1 and 38, and with them the crown wheel 39, rotate at the same speed and the gear ratios between the gear wheels 43 and 78, and 43 and 82 as well as between the crown wheel's smallest gear rim and the gear wheels 56 and 57 are so selected that the shafts 76 and 70, and 80 and 71 respectively rotate at the same speed and in opposite directions since the gear wheels 56 and 57 are coupled to the crown wheel's smallest gear rim. This means that with this coupling the forks 86 and 90 are stationary when the shaft 1 is rotating, whatever number of teeth the crown wheel's smallest gear rim may have. The gear wheels 66, 68, 74, 79 and 67, 69, 75, 83 are mutually of the same size. When the gear wheel 56 is moved into engagement with the nearest outer gear rim which has a number of teeth b in excess of the preceding gear rim, the gear wheel 74 will be set in rotation at a higher speed, corresponding to these teeth b, than the gear wheel 79 and consequently the fork 86 will drive the gear wheel 87 round and with it the gear wheels 95, 96, 101, 102, 98 and 35 and thus the price calculating mechanism 37. The gear wheel 97 will remain stationary during this time. The price calculating mechanism will thus be set in rotation corresponding to the gear rim on the crown wheel which is coupled to the gear wheel 56, and corresponding to the rotation of the shaft 1 which represents a given quantity of fluid retailed. If the gear wheel 56 is coupled to another gear rim on the crown wheel 39, the price calculating mechanism will register a price corresponding to that gear rim for the fluid retailed. If the gear rims on the crown wheel are made to correspond to a unit price from 0–9 cents per unit quantity, one litre of retailed fluid for example, it will be possible to adjust the gear wheel 56 for these prices per litre just as required.

In the same way the gear wheel 57 coupled to the second gear rim on the crown wheel, counted from the centre, can be made to register a price of 10 cents per unit quantity of the fluid retailed. Initially it may be considered that the gear wheel 56 is engaged with the innermost gear rim on the crown wheel and therefore acts upon the price calculating mechanism when the shaft 1 is rotated. On the other hand the rotation of the gear wheel 57 is transmitted to the gear wheels 67, 69 and 75 which latter attains a greater speed than the gear wheel 83 and consequently drives the fork 90 round, the movement of the latter being transmitted to the gear wheels 91 and 97, the latter of which, with the gear wheels 101 and 102 roll towards the stationary gear wheel 96 and are thereby each set in rotation independently, these rotary movements being transmitted to the gear wheel 98 which begins to rotate and drives the price calculating mechanism. By the suitable selection of the ratio 91, 97 the rotation obtained at the gear wheel 98 will correspond to a speed which is 10 times greater than the speed produced at the wheel 98 when only the gear wheel 56 was in engagement with the second gear rim on the crown, counting from the centre inwards. Thus it will at once be seen that when the gear wheel 57 is coupled instead to the third rim from the centre on the crown wheel, which corresponds to 20 cents per unit quantity of fluid retailed, the gear wheel 98 will rotate at a speed which is twice as great as that which was obtained when the gear wheel 57 was coupled to the gear rim on the crown wheel located nearest to the inside, etc. It will also be clear that the gear wheels 56 and 57, each coupled to the required gear rim on the crown wheel 39, will each and independently of one another, set the gear wheel 98 in rotation corresponding to the gear rims with which the respective gear wheels 56 and 57 are coupled. Consequently it is possible with a crown wheel which has only 10 gear rims, by adjusting the gear wheels 56 and 57, to set the latter for a price per unit quantity of fluid retailed which may lie anywhere between 0 and 99 cents per litre, and immediately the shaft 1 is set in motion the price calculating mechanism will immediately register the cost for the quantity of fluid retailed. Should the price exceed 99 cents per litre it is possible, by increasing the number of gear rims by one or two at the outset, to register in this case also by adjusting the device between 0 and 109 to 119 cents per litre. By the employment of a further gear wheel corresponding to the gear wheels 56 and 57, the same may be used for hundreds of cents per litre, and combined in a corresponding manner with the movements from the gear wheels 56 and 57 before the combined movement is transmitted to the gear wheel 35 and to the price calculating mechanism. In such a case the shaft for the hundreds gear wheel is located in the plane of the shafts 50 and 51, at right angles to the latter for example. The crown wheel will then only need to have ten gear rims.

The possibility of adjusting the unit price within wide limits with one gear wheel having a small number of gear rims is thus one of the advantages of the invention in its application to a price calculating mechanism in combination with a retailing device for fluids. The invention is also applicable, however, to other technical branches.

What I claim is:

1. In a gear changing system, a driving shaft, a gear wheel having a number of gear rims of different diameter, the diameter and number of teeth of one of said gear rims being selected optionally and the difference in the number of teeth between adjacently situated gear rims being constant and independent of the number of teeth on said one gear rim, a transmission for driving said gear wheel from said driving shaft, at least two further shafts, a gear wheel movable along each of said further shafts for independent engagement with any one of said gear rims, a differential gear unit for each of said movable gear wheels and each having two driving gear wheels, two planet wheels and an output gear wheel, transmissions for driving one of said driving gear wheels of each of said differential gear units from said driving shaft, a transmission between said movable gear wheels and the second driving gear wheel of each of said differential gear units, the movements of said two driving gear wheels of each of said differential gear units being opposite in direction, a gearing for the combination of the movements of said output gear wheels of said differential gear units and an output gear wheel in said gearing receiving said combined movement.

2. In a gear changing system, a driving shaft, a gear wheel having a number of gear rims of different diameter, the diameter and number of teeth of one of said gear rims being selected optionally and the difference in the number of teeth between adjacently situated gear rims being constant and independent of the number of teeth on said one gear rim, a transmission for driving said gear wheel from said driving shaft, at least two further shafts, a gear wheel movable along each of said further shafts for independent engagement with any one of said gear rims, a differential gear unit for each of said movable gear wheels and each having two driving gear wheels, two planet wheels and an output gear wheel, a compensating gear wheel on the same shaft as the gear wheel having a number of gear rims and in driving engagement with each one of said differential gear units, a transmission between said movable gear wheels and the second driving gear wheel of each of said differential gear units, the movements of said two driving gear wheels of each of said differential gear units being opposite in direction, a gearing unit for the combination of the movements of said output gear wheels of said differential gear units and an output gear wheel in said gearing receiving said combined movement.

3. In a gear changing system, a driving shaft driven from a device for retailing fluids, a gear wheel having a number of gear rims of different diameter, the diameter and number of teeth of one of said gear rims being selected optionally and the difference in the number of teeth between adjacently situated gear rims being constant and independent of the number of teeth on said one gear rim, a transmission for driving said gear wheel from said driving shaft, at least two further shafts, a gear wheel movable along each of said further shafts for independent engagement with any one of said gear rims, a differential gear unit for each of said movable gear wheels and each having two driving gear wheels, two planet wheels and an output gear wheel, a compensating gear wheel on the same shaft as the gear wheel having a number of gear rims and in driving engagement with each one of said differential gear units, a transmission between said movable gear wheels and the second driving gear wheel of each of said differential gear units, the movements of said two driving gear wheels of each of said differential gear units being opposite in direction, a gearing for the combination of the movements of said output gear wheels of said differential gear units, said gearing being freely supported on the shaft of the gear wheel provided with gear rims and said differential gear units being arranged around said gearing with the shafts of the second driving wheels parallel to the shaft of the gear wheel provided with the gear rims and an output gear wheel in said gearing receiving said combined movement.

BIRGER STEN OLSSON.

REFERENCES CITED

The following references are of record in the file of this patent:

UNITED STATES PATENTS

| Number | Name | Date |
|---|---|---|
| 798,665 | De Leeuw | Sept. 5, 1905 |
| 912,736 | Ruck | Feb. 16, 1909 |
| 2,145,843 | Maxson | Jan. 31, 1931 |
| 2,151,239 | Slye et al. | Mar. 21, 1939 |

FOREIGN PATENTS

| Number | Country | Date |
|---|---|---|
| 87,210 | Sweden | June 25, 1936 |
| 358,421 | France | Feb. 15, 1906 |